Nov. 22, 1932.  R. H. MITCHELL ET AL  1,888,511
POWER LIFT
Filed June 20, 1932    4 Sheets-Sheet 1
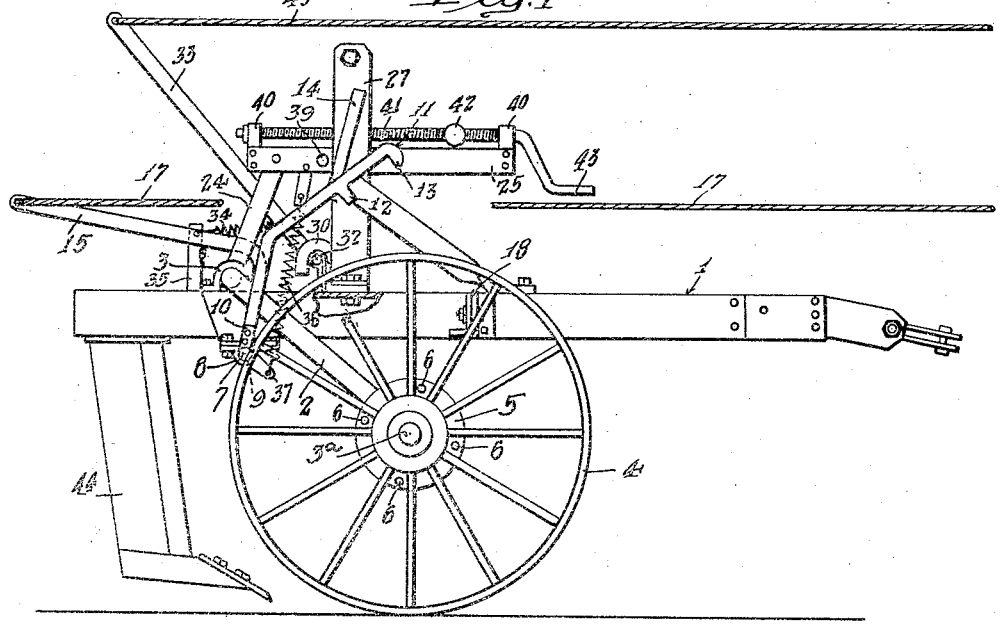
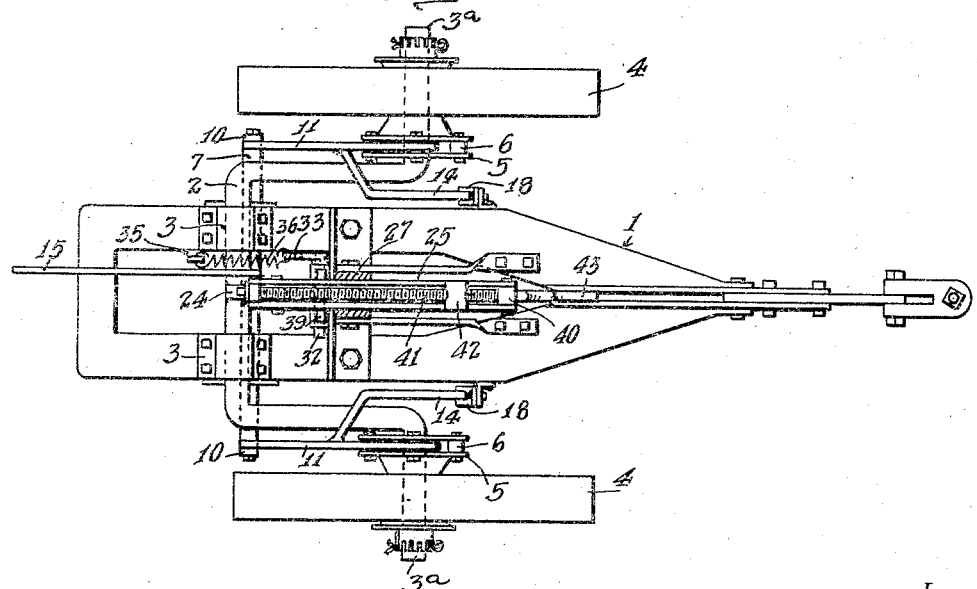
Inventors
Rollie H. Mitchell
Jesse A. Vaughn
By Lyon & Lyon
Attorneys

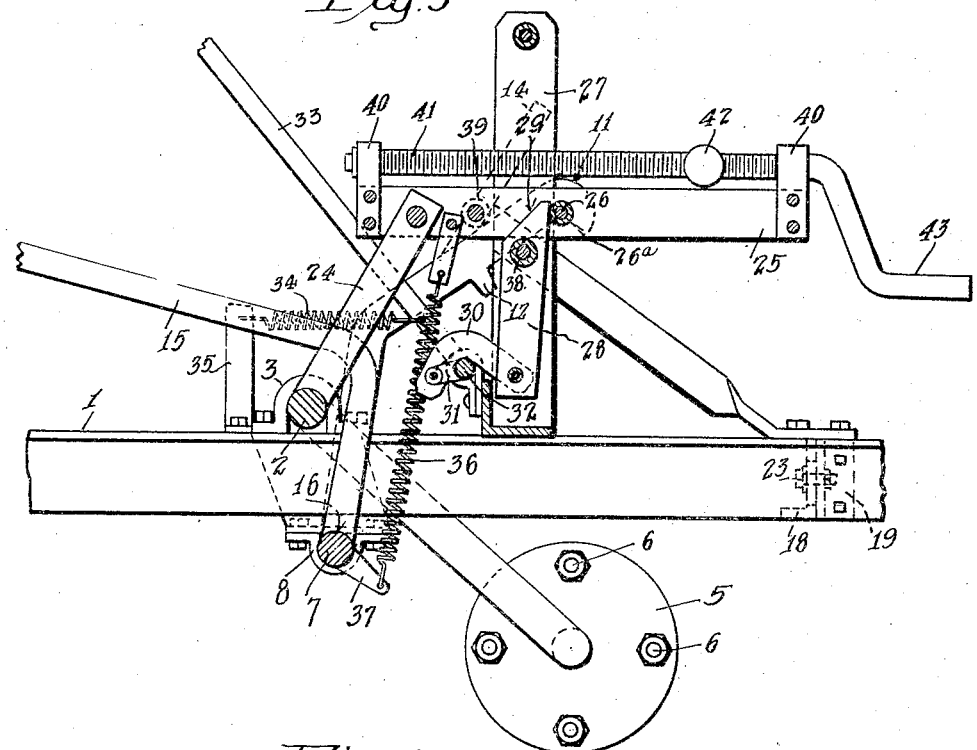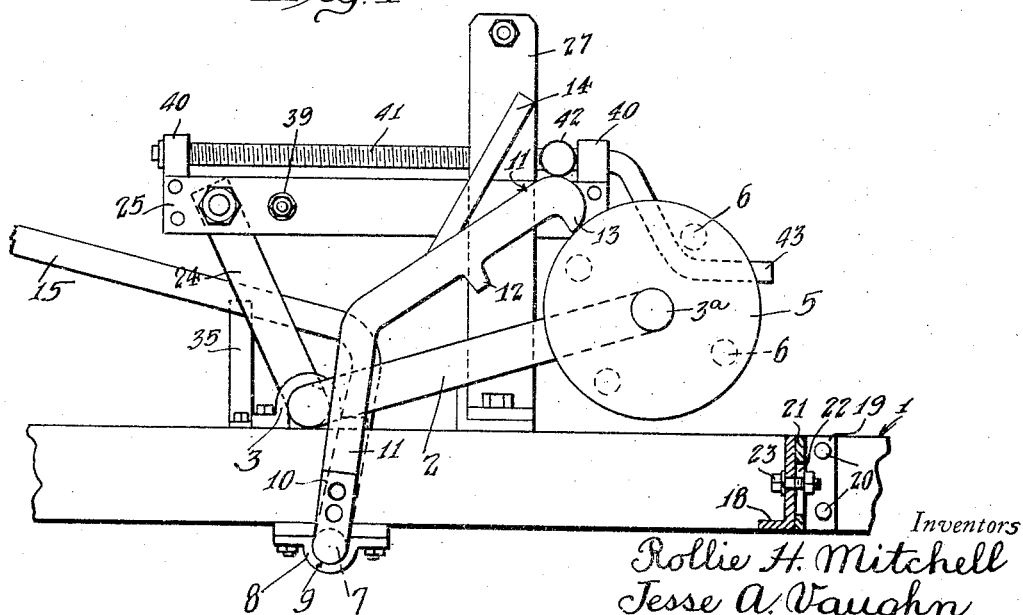

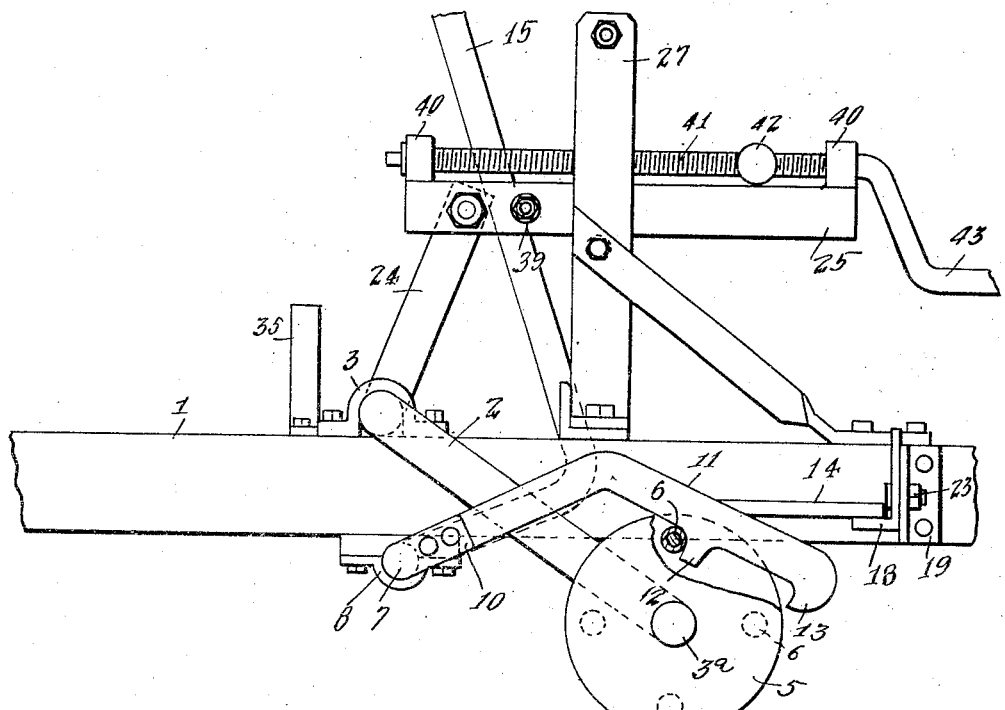
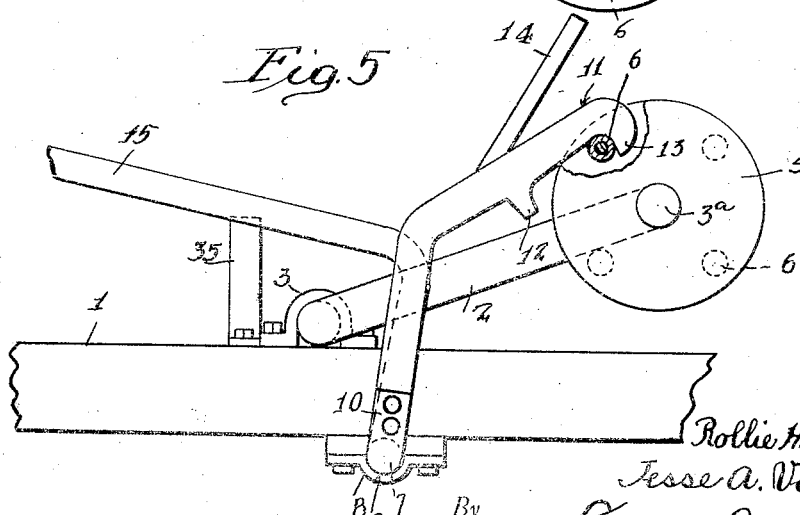

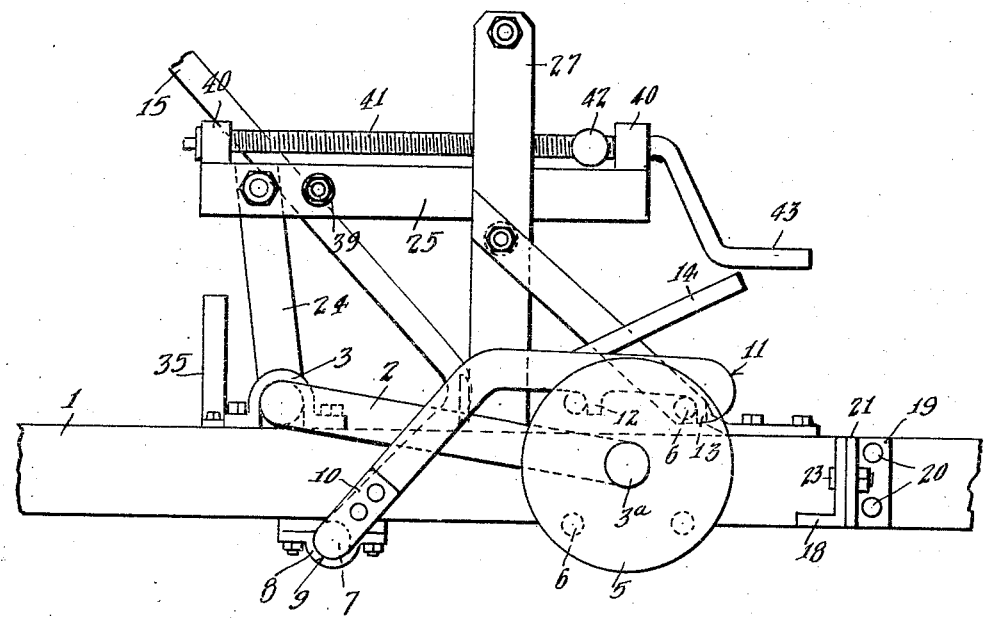

Patented Nov. 22, 1932

1,888,511

UNITED STATES PATENT OFFICE

ROLLIE H. MITCHELL, OF SOUTH GATE, AND JESSE A. VAUGHN, OF LOS ANGELES, CALIFORNIA, ASSIGNORS TO KILLEFER MANUFACTURING CORPORATION, LTD., OF LOS ANGELES, CALIFORNIA, A CORPORATION OF CALIFORNIA

POWER LIFT

Application filed June 20, 1932. Serial No. 618,100.

This invention relates to improvements in power lifts for use in connection with agricultural implements, scrapers or in other earth working or carrying devices.

The principal object of this invention is to provide an agricultural implement with a power lift which will develop a greater lifting force for elevating the implement from its ground engaging position to its elevated inoperative position, and also to provide a power lift which will insure an accurate and positive disengagement of the lifting racks from the trundle wheels when the implement has been elevated to its predetermined height.

A further object is to provide a rack and trundle wheel lifting means in combination with a positive rack stop mounted upon each side of the frame for engagement with the rack to effect disengagement of the rack and trundle lifting means when the implement has been elevated to a predetermined height.

A further object is to provide a rack stop adjustably mounted upon each side of the implement frame whereby the exact point of disengagement of the rack from the trundle wheel may be nicely adjusted.

A further object is to provide a stop means which will prevent the implement from being elevated above a predetermined height should the rack stops for any reason fail to effect disengagement of the racks from the trundle wheels.

A further object is to provide a locking means which will automatically lock the implement in its elevated position when the lifting means are disengaged.

Other objects and advantages of this invention will be apparent as the nature of the same is more fully understood from the following description and accompanying drawings, wherein is set forth what is now considered to be a preferred embodiment.

It should be understood, however, that this particular embodiment of the invention is chosen principally for the purpose of exemplification, and that variations therefrom in details of construction or arrangement of the parts may accordingly be effected and yet remain within the spirit and scope of the invention as the same is set forth in the appended claims.

In the drawings:

Figure 1 is a side elevation of the invention, illustrating the implement locked in elevated position;

Figure 2 is a plan view of Figure 1;

Figure 3 is a diagrammatic representation of Figure 1;

Figure 4 is a diagrammatic representation similar to Figure 3 with the exception that the implement is illustrated in its lowered or earth working position;

Figure 5 is a diagrammatic representation illustrating the rack in the position it will assume when initially swung into engagement with the trundle wheel to start the lifting operation;

Figure 6 is a diagrammatic representation illustrating the rack gearing along the trundle wheel during the lifting operation; and Figure 7 is a diagrammatic representation illustrating the rack in engagement with the rack stop to effect a positive disengagement of the rack from the trundle wheel, and also illustrating the elevating stop about to act to prevent further lifting of the implement.

A preferred construction of our invention, as disclosed in the drawings, includes a frame 1. A crank axle 2 is journaled transversely of the frame by means of bearings 3. The crank axle is provided at each end thereof with aligned spindles 3a, upon which are journaled the road or traction wheels 4. A trundle wheel 5 is secured to the inner side of each wheel and is provided with a plurality of pins or rungs 6. We preferably use four rungs, but a greater or lesser number may be used.

A shaft 7 is journalled transversely of the frame by means of bearings 8. Shaft 7 is preferably positioned below the frame and slightly ahead of the crank axle, but it is to be understood that the shaft may be located on the frame at any other suitable location. Each end of shaft 7 is bent, as at 9, to form arms 10, to each of which is suitably mounted a lifting rack 11.

In the drawings, we have shown the lifting racks as bolted to arms, but they may be riveted or welded thereto, as desired. The lifting racks are provided with teeth 12 and 13, and also each rack is provided with a kick-off or disengaging bracket 14, which bracket may be formed integral with the rack or formed separately and suitably secured thereto.

An actuating lever 15 may be suitably secured to shaft 7, as at 16, by welding. For convenience of operation, a rope 17 may be connected to the extended end of lever 15, whereby the operator may actuate lever 15 from his seat on the tractor (not shown).

A lifting rack kick-off or disengaging stop 18 may be suitably mounted upon each side of frame 1. The kick-off stops are positioned to be engaged by the kick-off brackets 14 of the lifting racks so as to positively insure disengagement of the racks from the trundle wheels when the implement has been elevated to a predetermined height.

As illustrated in the drawings, the kick-off stops 18 may be adjustably mounted upon each side of frame 1 by means of the angular bracket 19.

One flange of each bracket 19 is suitably secured to the frame by means of rivets 20. The protruding flange 21 of the bracket may be provided with a slot 22 through which bolts 23 extend. The kick-off stop 18 is adjustably clamped to the protruding flange of the bracket by means of the bolts 23 whereby the adjustment of stop 18 is accomplished by loosening the bolts and sliding stop 18 with relation to flange 21; slot 22 permits and governs the extent of such movement. When the desired point is reached, the bolts are tightened to securely clamp the kick-off stop in the adjusted position.

Any suitable means may be provided for locking the implement in elevated position. However, we prefer to make use of the locking means fully disclosed in the co-pending application of Jesse A. Vaughn, Serial No. 568,258, filed October 12, 1931, and entitled "Locking and tripping device for a power lift implement."

The locking means disclosed in the above-referred to application and as made use of in our invention briefly includes suitably securing one end of the lever 24 to the crank axle, as for example by welding, and pivotally connecting to the opposite end of the lever a pair of spaced sliding bars 25. A stop pin 26 passes through bars 25 intermediate the ends thereof. A roller 26ª may be placed upon pin 26 between the sliding bars to assist in the smoothness of operation of the locking means and to prevent undue wear of pin 26. Suitably mounted upon frame 1 is a standard 27 formed of spaced bars and braces. The spaced bars 25 slidably extend through standard 27. A latch bar 28 is pivotally mounted in the standard and is positioned so that one end, the latching end 29, projects between the spaced bars 25 and engages the pin and roller stop means to retain the bars against movement, and thus locking the implement in elevated position. A toggle link 30, or any other suitable means, may be provided for preventing rotation of the latch bar until it is desired to release the locking means. The toggle link is pivoted at one end to the lower end of the latch bar, while the opposite end of the toggle link is pivotally connected to the arm 31 of the toggle shaft 32. The latch bar, toggle link and toggle shaft are so arranged that when the latch bar is in locking position a toggle effect is produced which will effectively retain the parts in locking position, but which toggle effect may be broken by actuating the lever 33 mounted upon the toggle shaft, whereby the latch bar is permitted to swing sufficiently to release the pin and roller carried by the bars 25 and thus permit the implement to be lowered into working position.

A spring 34 may be provided for normally and yieldingly retaining the latch bar in locked position. The spring may extend between the actuating lever 33 and a portion of the frame, as for example bracket 35.

A spring 36 may extend between the sliding bars 25 and an extended portion 37 of lever 15, whereby the lever 15 is yieldingly urged to retain the lifting racks in inoperative position and also acts to yieldingly urge the sliding bars 25 against the rollers 38, which rollers are mounted upon the latch bar pivot pin.

A stop for limiting the extent to which the implement may be elevated and to thus prevent the implement from being bent or wrecked should the elevating means for any reason fail to release at the predetermined point may be provided by mounting the stop 39 on the sliding bars 25. The stop 39 should be positioned so as to permit the implement to be raised slightly above the point at which the roller 26ª passes over the end 29 and latch bar 28 to insure in every instance the locking of the implement in elevated position.

To limit the extent to which the implement may be lowered, the sliding bars 25 are provided at each end with bearings 40, an adjusting screw 41 journaled in the bearings and a stop nut 42 threaded upon the adjusting screw. The stop nut engages against the face of standard 27 and thereby prevents further movement of the sliding bars rearwardly, thus limiting the downward movement of the implement. A crank 43 is mounted upon the forward end of the adjusting screw whereby the position of the stop nut may be adjusted to determine the extent to which the frame may be lowered.

Mounted upon the frame may be one or more earth working tools 44.

The operation of the implement is substantially as follows: The implement, as illustrated in Fig. 1, is in the carrying or transporting position and would be retained in this position until arriving at the locality at which the earth working operation is to start. To lower the implement into the earth working position, the lever 33 is swung forwardly by means of rope 45, whereby the toggle lock is released, thus permitting the latch bar 28 to swing forwardly, whereupon the stop roller 26ª rolls off the latch bar permitting the sliding bars to move rearwardly until stop nut 42 engages standard 27.

The rearward movement of the sliding bars 25 through lever 24 permits the crank axle to rotate whereby the implement is lowered into the cultivating position.

When it is desired to raise the implement into the carrying position, the actuating lever 15 is swung forwardly by means of rope 17 to rotate shaft 7 and to thereby swing the lifting racks into engagement with the trundle wheels. As the implement is moved forward, the traction wheels are caused to rotate, which in turn rotates the trundle wheels, and as teeth 13 of the racks are now in engagement with one of the rungs of the trundle wheels the racks will be caused to gear along the trundle wheels until teeth 12 engage the next rung of the trundle wheels, and finally when the implement has been elevated to the predetermined height, the kick-off brackets 14 of the lifting racks will engage the kick-off stops 18 of the frame to cause the lifting racks to be lifted out of engagement with the trundle wheels. Just prior to the disengagement of the rack and trundle wheel lifting means the locking roller 26ª passes over the end 29 of the latch bar 28 to lock the implement in elevated position.

Having fully described the prefered embodiment of this invention, it is to be understood that we do not wish to be limited to the exact construction herein disclosed, which may obviously be varied without departing from the spirit of the invention, as set forth in the appended claims.

We claim:

1. In a power lift implement, a frame, a crank axle journaled transversely of said frame and having aligned spindles, traction wheels journaled upon said spindles, a trundle wheel mounted upon each wheel, a lifting rack pivotally mounted on the frame at a point beneath the axis of the axle and normally extending to a point adjacent said trundle wheel, a rack stop mounted on the frame, means for swinging said lifting rack into an engageable position with said trundle wheel whereby when one tooth of the rack engages one rung of the trundle wheel and the trundle wheel rotated, the rack will gear along the trundle wheel until the implement has been elevated to a predetermined height at which point the rack will engage the rack stop and be thereby automatically disengaged from said trundle wheel.

2. In a power lift implement, a frame, a crank axle journaled transversely of said frame and having aligned spindles, traction wheels journaled upon said spindles, a trundle wheel mounted upon each wheel, a lifting rack pivotally mounted on the frame at a point beneath the axis of the axle and normally extending to a point adjacent said trundle wheel, a rack stop mounted on the frame, means for swinging said lifting rack into an engageable position with said trundle wheel whereby when one tooth of said rack engages one rung of the trundle wheel and the trundle wheel rotated, the rack will gear along the trundle wheel until the implement has been elevated to a predetermined height at which point the rack will engage said rack stop and thereby automatically be disengaged from said trundle wheel, a crank projecting from the axle, a bar pivotally engaged with the crank and provided with a latch pin, a latch, and a supporting structure on the frame for the same latch so that the said latch may engage said latch pin to lock the implement in elevated position.

3. In a power lift implement, a frame, a ground working tool supported by the frame, a crank axle journaled transversely of the frame, ground wheels journaled on the axle, a trundle wheel secured to each of said ground wheels, a shaft journaled transversely of the frame in advance of and below the crank axle, a lifting rack secured to each end of said shaft and in alignment with said trundle wheels, and a rack stop mounted upon each side of the frame and positioned to be engaged by the lifting racks to effect disengagement of the racks from the trundle wheels when the implement has been elevated to a predetermined height.

4. In a power lift implement, a frame, a ground working tool supported by said frame, a crank axle journaled transversely of the frame, ground wheels journaled on the axle, a trundle wheel secured to each of said ground wheels, a shaft journaled transversely of the frame in advance of and below the crank axle, a lifting rack secured to each end of said shaft and in alignment with said trundle wheels, a lever secured to said shaft operable for swinging the lifting racks into engagement with the trundle wheels, and a rack stop mounted upon each side of the frame and positioned to be engaged by the lifting racks to effect disengagement of the racks from the trundle wheels when the implement has been elevated to a predetermined height.

5. In a power lift implement, a frame, a ground working tool supported by said frame, a crank axle journaled transversely of the frame, ground wheels journaled on the axle, a trundle wheel secured to each of said ground wheels, a shaft journaled transversely of the frame in advance of and below the crank axle, a lifting rack secured to each end of said shaft and in alignment with said trundle wheels, a lever secured to said shaft operable for swinging the lifting racks into engagement with the trundle wheels, a spring means for normally retaining the lifting racks in retracted position, and a rack stop mounted upon each side of the frame and positioned to be engaged by the lifting racks to effect disengagement of the racks from the trundle wheels when the implement has been elevated to a predetermined height.

6. In a power lift implement, a frame, a ground working tool supported by said frame, a crank axle journaled transversely of the frame, ground wheels journaled on the axle, a trundle wheel secured to each of said ground wheels, a shaft journaled transversely of the frame in advance of and below the crank axle, a lifting rack secured to each end of said shaft and in alignment with said trundle wheels, a lever secured to said shaft operable for swinging the lifting racks into engagement with the trundle wheels, a spring means for normally retaining the lifting racks in retracted position, a rack stop mounted upon each side of the frame and positioned to be engaged by the lifting racks to effect disengagement of the racks from the trundle wheels when the implement has been elevated to a predetermined height, and a locking means automatically operable when the implement has been elevated to a predetermined height for retaining the implement in its elevated position.

7. In a power lift implement, a frame, a ground working tool supported by said frame, a crank axle journaled transversely of the frame, ground wheels journaled on the axle, a trundle wheel secured to each of said ground wheels, a shaft journaled transversely of the frame in advance of and below the crank axle, a lifting rack secured to each end of said shaft and in alignment with said trundle wheels, a lever secured to said shaft operable for swinging the lifting racks into engagement with the trundle wheels, a spring means for normally retaining the lifting racks in retracted position, a rack stop mounted upon each side of the frame and positioned to be engaged by the lifting racks to effect disengagement of the racks from the trundle wheels when the implement has been elevated to a predetermined height, a locking means automatically operable when the implement has been elevated to a predetermined height for retaining the implement in its elevated position, and means operable for releasing said locking means.

8. In a power lift implement, a frame, a crank axle journaled transversely of said frame, ground wheels jouناled on the axle, a trundle wheel secured to each of said ground wheels, a shaft journaled transversely of the frame, a lifting rack secured to each end of said shaft and in alignment with said trundle wheels, a lever secured to said shaft operable for swinging the lifting racks into engagement with the trundle wheels, means for normally retaining said racks in retracted position, and a rack stop mounted upon each side of the frame and positioned to be engaged by said lifting racks to effect disengagement of the racks from said trundle wheels when the implement has been elevated to a predetermined height.

9. In a power lift implement, a frame, a crank axle journaled transversely of said frame, ground wheels journaled on the axle, a trundle wheel secured to each of said ground wheels, a shaft journaled transversely of the frame, a lifting rack secured to each end of said shaft and in alignment with said trundle wheels, a lever secured to said shaft operable for swinging the lifting racks into engagement with the trundle wheels, means for normally retaining said racks in retracted position, a rack stop mounted upon each side of the frame and positioned to be engaged by said lifting racks to effect disengagement of the racks from said trundle wheels when the implement has been elevated to a predetermined height, and an elevating stop means operable for preventing the implement from being elevated above the predetermined height.

10. In a power lift implement, a frame, a crank axle journaled transversely of said frame, ground wheels journaled on the axle, a trundle wheel secured to each of said ground wheels, a shaft journaled transversely of the frame, a lifting rack secured to each end of said shaft and in alignment with said trundle wheels, a lever secured to said shaft operable for swinging the lifting racks into engagement with the trundle wheels, means for normally retaining said racks in retracted position, a rack stop mounted upon each side of the frame and positioned to be engaged by said lifting racks to effect disengagement of the racks from said trundle wheels when the implement has been elevated to a predetermined height, an elevating stop means operable for preventing the implement from being elevated above the predetermined height, and a locking means automatically operable when the implement has been elevated to a predetermined height for retaining the implement in its elevated position.

Signed at Los Angeles, Calif., this 18th day of May, 1932.

ROLLIE H. MITCHELL.
JESSE A. VAUGHN.